United States Patent
Kang et al.

(10) Patent No.: US 7,179,321 B2
(45) Date of Patent: Feb. 20, 2007

(54) FACILITATED TRANSPORT MEMBRANES COMPRISING A POROUS SUPPORT AND A SOLID POLYMER ELECTROLYTE CONSISTING OF A TRANSITION METAL SALT AND A POLYMER HAVING PHTHALIC STRUCTURE

(75) Inventors: Yong Soo Kang, Seoul (KR); Hoon Sik Kim, Seoul (KR); Jong Hak Kim, Seoul (KR); Kookheon Char, Seoul (KR); Sang Wook Kang, Seoul (KR); Jongok Won, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 383 days.

(21) Appl. No.: 10/822,258

(22) Filed: Apr. 9, 2004

(65) Prior Publication Data

US 2004/0211319 A1  Oct. 28, 2004

(30) Foreign Application Priority Data

Apr. 11, 2003  (KR) ...................... 10-2003-0022841

(51) Int. Cl.
*B01D 53/22* (2006.01)
(52) U.S. Cl. ........................ 95/45; 95/50; 96/11; 96/12; 521/27
(58) Field of Classification Search .................... 95/45, 95/50; 96/11, 12; 521/27
See application file for complete search history.

(56) References Cited

U.S. PATENT DOCUMENTS 5,670,051 A * 9/1997 Pinnau et al. ................ 210/651
6,706,771 B2 * 3/2004 Kim et al. .................... 521/27

* cited by examiner

*Primary Examiner*—Robert A. Hopkins
(74) *Attorney, Agent, or Firm*—Jones Day

(57) ABSTRACT

The present invention relates to a facilitated transport membrane for separation of alkene hydrocarbons from hydrocarbon mixtures, comprising a porous support and a solid polymer electrolyte consisting of a transition metal salt and a polymer having phthalic structure, in which the electrolyte is in solid state at its operating temperature. The facilitated transport membrane is prepared by forming a solid polymer electrolyte consisting of a transition metal salt and a polymer on a porous support. The transition metal salt can selectively and reversibly form a complex with alkene hydrocarbons and the polymer can dissociate the transition metal salt. In particular, the polymer matrix allows the transition metal salt to be well dissociated because it has a phthalic structure capable of being coordinated to a transition metal ion.

10 Claims, No Drawings

FACILITATED TRANSPORT MEMBRANES COMPRISING A POROUS SUPPORT AND A SOLID POLYMER ELECTROLYTE CONSISTING OF A TRANSITION METAL SALT AND A POLYMER HAVING PHTHALIC STRUCTURE

FIELD OF THE INVENTION

The present invention relates to a facilitated transport membrane with an improved permeance and selectivity to alkene hydrocarbons. In particular, the present invention relates to a facilitated transport membrane prepared by forming a solid polymer electrolyte consisting of a transition metal salt and a polymer having phthalic structure capable of forming a complex with a transition metal ion; and coating the electrolyte on a porous support with good permeance and superior mechanical strength. The facilitated transport membrane is characterized in that its permeance and selectivity to alkene hydrocarbons are high and a complex of the metal and polymer ligand in the solid polymer electrolyte maintains its activity as a carrier for alkene hydrocarbons even under long-term dry operating conditions.

BACKGROUND OF THE INVENTION

Alkene hydrocarbons are primarily produced by pyrolysis of naphtha obtained from a petroleum refining process. They are important raw materials that form the basis of the current petrochemical industry. However, they are generally produced along with alkane hydrocarbons such as ethane and propane. Thus, alkene hydrocarbons/alkane hydrocarbons separation technology is of significant importance in the related industry.

Currently, the traditional distillation process is used mostly for the separation of an alkene/alkane mixture such as ethylene/ethane or propylene/propane. The separation of such a mixture, however, requires the investment of large-scale equipment and high-energy cost because alkene and alkane have similarities in molecular size and physical properties such as relative volatility.

In the distillation process used hitherto, for example, a distillation column having about 120–160 trays should be operated at a temperature of −30° C. and a high pressure of about 20 atm for separation of an ethylene and ethane mixture. For separation of a propylene and propane mixture, a distillation column having about 180–200 trays should be operated at a temperature of −30° C. and a pressure of about several atms in the reflux ratio of 10 or more. As such, there has been a continuous need for the development of a new separation process that can replace the prior distillation process, which requires the investment of large-scale equipment and high-energy cost.

A separation process that could be considered as a replacement for said prior distillation process is one that uses a separation membrane. Separation membrane technology has progressed remarkably over the past few decades in the field of separating gas mixtures, for example, the separation of nitrogen/oxygen, nitrogen/carbon dioxide and nitrogen/methane, etc.

However, the satisfactory separation of alkene/alkane mixtures cannot be accomplished by using traditional gas separation membranes because alkene and alkane are very similar in terms of their molecular size and physical properties. A facilitated transport membrane based on a different concept from the traditional gas separation membranes is considered to be a separation membrane that can achieve excellent separation performance for alkene/alkane mixtures.

The separation of mixtures in a separation process using a separation membrane is achieved by the difference in permeance between the individual components constituting the mixtures. Most materials of a separation membrane have many limitations on their application because of an inverse correlation between permeance and selectivity. However, the concurrent increase of permeance and selectivity is made possible by applying a facilitated transport phenomenon. Consequently, the scope of their application can be considerably increased. If a carrier capable of selectively and reversibly reacting with a specific component of a mixture is present in a separation membrane, mass transport is facilitated by additional material transport generated from a reversible reaction of a carrier and a specific component. Therefore, overall mass transport can be indicated by Fick's law and the sum of material transport caused by a carrier. This phenomenon is referred to as facilitated transport.

A supported liquid membrane is an example of a membrane prepared by applying the concept of facilitated transport. The supported liquid membrane is prepared by filling a porous thin layer with a solution that is obtained by dissolving a carrier capable of facilitating mass transport in a solvent such as water, etc. Such a supported liquid membrane has somewhat succeeded.

Steigelmann and Hughes, for example, prepare a supported liquid membrane in which the selectivity of ethylene/ethane is about 400–700 and the permeance of ethylene is 60 GPU [1 GPU=1×10$^{-6}$ cm$^3$ (STP)/cm$^2$·sec·cmHg], which are satisfactory performance results for permeance separation (see U.S. Pat. Nos. 3,758,603 and 3,758,605). However, the supported liquid membrane exhibits the facilitated transport phenomenon only under wet conditions. There is an inherent problem in that its initial permeance separation performance cannot be maintained for an extended period of time due to solvent loss. Thereby, the separation performance is decreased with time.

In order to solve the problem, Kimura, etc., suggest a method that enables facilitated transport by substituting a suitable ion in an ion-exchange resin (see U.S. Pat. No. 4,318,714). This ion-exchange resin membrane also has a drawback, however, in that the facilitated transport phenomenon is exhibited only under wet conditions, similar to the supported liquid membrane.

Ho suggests another method for the preparation of a complex by using water-soluble glassy polymer such as polyvinyl alcohol (see U.S. Pat. Nos. 5,015,268 and 5,062,866). However, the method also has a drawback in that satisfactory results are obtained only when feed gas is saturated with water vapor by passing the feed gas through water or when a membrane is swelled with ethylene glycol or water.

In all the instances described above, the separation membrane must be kept in wet conditions that enable the membrane to contain water or other similar solvents. When a dry hydrocarbon gas mixture—for example, an alkene/alkane mixture free of a solvent such as water—is separated by using the membrane, solvent loss is unavoidable with time. Therefore, a method is necessary for periodically feeding a solvent to a separation membrane in order to continuously sustain the wet condition of the separation membrane. It is, however, rarely possible for the method to be applied to a practical process, and the membrane is not stable.

Kraus, etc., develop a facilitated transport membrane by using another method (see U.S. Pat. No. 4,614,524). According to the patent, a transition metal ion is substituted in an ion-exchange membrane such as Nafion, wherein the membrane is plasticized with glycerol, etc. The membrane could not be utilized, however, in that its selectivity of ethylene/ethane is as low as about 10 when dry feed is used. The membrane also has no selectivity when a plasticizer is not used. Furthermore, the plasticizer is lost with time.

In view that a usual polymer separation membrane cannot separate an alkene/alkane mixture having similar molecular size and physical properties, as described above, use of a facilitated transport membrane capable of selectively separating only alkane is necessary. In conventional facilitated transport membranes, however, the activity of a carrier is maintained by using one of the following methods: filling a solution containing a carrier into the porous membrane; adding a volatile plasticizer; or saturating a feed gas with water vapor. Such a membrane cannot be utilized due to the problem of declining stability since components constituting the membrane are lost with time. There is also the problem of later having to remove solvents such as water, etc., which are periodically added in order to sustain activity, from the separated product.

Therefore, there is a need for the development of a separate membrane that can replace the prior distillation process requiring the investment of large-scale equipment and high-energy cost in the separation of an alkene/alkane mixture. The separation membrane in this regard would not contain volatile components and would have high selectivity and permeance so as to maintain the activity even under long-term dry operating conditions.

SUMMARY OF THE INVENTION

An object of the present invention is to prepare a facilitated transport membrane by introducing the principle of non-volatile polymer electrolyte used in a polymer battery into a facilitated transport membrane, in which the facilitated transport membrane has a high permeance and selectivity of unsaturated hydrocarbons such as alkene even under dry conditions and has no problems in stability, such as carrier loss, to be able to sustain the activity for a prolonged period of time.

That is, an object of the present invention is to prepare a facilitated transport membrane having its prominent characteristics in separating alkene hydrocarbons from mixtures of alkene hydrocarbons and alkane hydrocarbons by coating a solid polymer electrolyte consisting of a transition metal salt and a polymer having phthalic structure on a porous support. The facilitated transport membrane prepared according to the present invention has a high permeance and selectivity of alkene and maintains activity even under long-term dry operating conditions without the feed of liquid solvents.

DETAILED DESCRIPTION OF THE PRESENT INVENTION

In the facilitated transport membrane prepared according to the present invention, a polymer ligand and a metal ion of a transition metal salt in a non-volatile polymer electrolyte form a complex. The metal ion of the complex then reacts selectively and reversibly with a double bond of alkene, resulting in the facilitated transport of alkene. Thus, the membrane can selectively separate alkene hydrocarbons.

In particular, use of a polymer having phthalic structure allows a transition metal ion to be coordinated. The facilitated transport membrane according to the present invention therefore does not exhibit performance deterioration, particularly the reduction of a transition metal ion to a transition metal, of an electrolyte prepared with a polymer having a functional group including oxygen and/or nitrogen. Thus, the performance of the membrane is prolonged.

The present invention is described in detail below.

The facilitated transport membrane according to the present invention comprises a solid polymer electrolyte and a porous support supporting the electrolyte, in which the electrolyte consists of a transition metal salt and a polymer having phthalic structure and is in solid state at its operating temperature.

Hydrocarbon mixtures to be separated in the present invention contain at least one alkene hydrocarbon and at least one alkane hydrocarbon and/or other gas. The alkene hydrocarbon includes ethylene, propylene, butylene, 1,3-butadiene, isobutylene, isoprene, etc.; the alkane hydrocarbon includes methane, ethane, propane, butane, isobutane, etc.; and the other gas includes oxygen, nitrogen, carbon dioxide, carbon monoxide, water, etc.

Any porous support having good permeance and sufficient mechanical strength may be used in the present invention. For example, both a conventional porous polymer membrane and a ceramic membrane may be used. Plate, tubular, hollow or other types of supports may also be used in the invention.

The solid polymer electrolyte according to the present invention consists of a transition metal salt acting as a carrier and a polymer having phthalic structure. The transition metal salt in the electrolyte is not in simply dispersed or mixed state. It is dissociated into a cation and an anion on the polymer. This is due to strong interaction of the transition metal ion and the phthalic structure of polymer, resulting in the formation of a complex. Therefore, contrary to a conventional membrane, the separation membrane according to the present invention does not require the addition of water to maintain the activity of a carrier or the addition of other solvents to swell the polymer matrix. It also selectively facilitates the transport of a dry alkene hydrocarbon.

In the facilitated transport membrane according to the present invention, the electrolyte consisting of a transition metal salt acting as a carrier and a polymer having phthalic structure has a substantial effect on the selective separation of alkene hydrocarbon. Thus, the properties of the transition metal salt and polymer determine the selective permeation separation of alkene hydrocarbon from the corresponding alkane hydrocarbon.

The transition metal salt is comprised of a cation of a transition metal and an anion of a salt, and it is dissociated into ions on the polymer. The cation reacts reversibly with a double bond of an alkene hydrocarbon to form a complex and directly participate in the facilitated transport. That is, a cation of a transition metal in the electrolyte interacts with an anion of salt, a polymer and an alkene hydrocarbon. Therefore, they must be properly selected to obtain a separation membrane having high selectivity and permeance. The stability of both the selected polymer and the formed metal complex also serves an important role in long-term operation.

It is well known that a transition metal reacts reversibly with an alkene hydrocarbon in a solution (see J. P. C. M. Van Dongen, C. D. M. Beverwijk, J. Organometallic Chem. 1973, 51, C36). The ability of a transition metal ion as a carrier is determined by the size of the π-complexation formed with alkene, which is determined by electronegativity. Electronegativity is a measure of the relative strength of an atom to attract covalent electrons when the atom is bonded with other atoms. The electronegativity values of transition metals are shown in Table 1 below.

TABLE 1

Electronegativity Values of Transition Metals

| | \multicolumn{6}{c}{Transition metal} | | | | | |
|---|---|---|---|---|---|---|
| | Sc | V | Cr | Fe | Ni | Cu |
| Electronegativity | 1.4 | 1.6 | 1.7 | 1.8 | 1.9 | 1.9 |
| | Y | Nb | Mo | Ru | Pd | Ag |
| Electronegativity | 1.3 | 1.6 | 2.2 | 2.2 | 2.2 | 1.9 |
| | La | Ta | W | Os | Pt | Au |
| Electronegativity | 1.0 | 1.5 | 2.4 | 2.2 | 2.3 | 2.5 |

If the electronegativity of a metal is high, the metal atom will more strongly attract electrons when it is bonded with other atoms. If the electronegativity of a metal is too high, the metal is not suitable as a carrier of the facilitated transport due to increased possibility of an irreversible reaction between the metal and π-electrons of alkene. Conversely, if electronegativity is too low, the metal cannot act as a carrier because of its low interaction with alkene.

Therefore, the electronegativity of a metal is preferably in the range of from 1.6 to 2.3 so that the transition metal ion reacts reversibly with alkene. Preferred transition metals within the above ranges include Mn, Fe, Co, Ni, Cu, Mo, Tc, Ru, Rh, Pd, Ag, Re, Os, Ir, Pt, or complexes thereof, etc.

An anion of a transition metal salt has an important role in improving the reversible reactivity of a transition metal ion and an alkene hydrocarbon, particularly in improving the reverse reaction rate, allowing readily separation of alkenes that form a complex with a transition metal in effluent. For a transition metal to act as a carrier of alkenes, a transition metal salt MX should be solvated on a polymer and form a complex as shown in Scheme 1 below.

MX+[G]⇒M—X—[G]  [Scheme 1]

Wherein [G] and M—X—[G] represent a functional group of a polymer and a complex, respectively. The difference in the solvation tendency of an anion on a polymer is generally dependent on the difference in the dielectric constant of the polymer. If the polarity of the polymer is low, however, the solvation stability of most anions is generally reduced. The lower the lattice energy of a transition metal salt, the lesser the tendency of an anion to form a strong ion pair with a cation. As a result, the decrease in solvation stability of an anion is relieved.

Therefore, it is preferable to select an anion of a transition metal salt that has low lattice energy in respect of a given cation of a transition metal, in order to readily solvate a transition metal salt and improve solvation stability in the facilitated transport membrane according to the present invention. The lattice energy of representative transition metal salts is given in Table 2 below.

TABLE 2

Lattice Energy of Metal Salts [kJ/mol][a]

| | $Li^+$ | $Na^+$ | $K^+$ | $Ag^+$ | $Cu^+$ | $Co^{2+}$ | $Mo^{2+}$ | $Pd^{2+}$ | $Ni^{2+}$ | $Ru^{3+}$ |
|---|---|---|---|---|---|---|---|---|---|---|
| $F^-$ | 1036 | 923 | 823 | 967 | 1060[b] | 3018 | | | 3066 | |
| $Cl^-$ | 853 | 786 | 715 | 915 | 996 | 2691 | 2733 | 2778 | 2772 | 5245 |
| $Br^-$ | 807 | 747 | 682 | 904 | 979 | 2629 | 2742 | 2741 | 2709 | 5223 |
| $I^-$ | 757 | 704 | 649 | 889 | 966 | 2545 | 2630 | 2748 | 2623 | 5222 |
| $CN^-$ | 849 | 739 | 669 | 914 | 1035 | | | | | |
| $NO_3^-$ | 848 | 756 | 687 | 822 | 854[b] | 2626 | | | 2709 | |
| $BF_4^-$ | 705[b] | 619 | 631 | 658[b] | 695[b] | 2127 | | | 2136 | |
| $ClO_4^-$ | 723 | 648 | 602 | 667[b] | 712[b] | | | | | |
| $CF_3SO_3^-$ | 779[b] | 685[b] | 600[b] | 719[b] | 793[b] | | | | | |
| $CF_3CO_2^-$ | 822[b] | 726[b] | 658[b] | 782[b] | 848[b] | | | | | |

[a] See H.D.B. Jenkins, CRC Handbook, 74th Ed., 12–13 (1993)
[b] Complexation energy for the formation of an ion pair such as $M^+_{(g)} + X^-_{(g)} \Rightarrow MX_{(g)}$ is calculated by using the Becke3LYP method (Becke3/6-311 + G*//Becke3/6-311 + G*) of Density Function Theory (DFT), which uses a basic set function of 6-311 + G*. The calculated value linear-regresses with the lattice energy described in literature a). It is confirmed that there is good linearity with a correlation coefficient of at least 0.94. Thus, the lattice energy of salts that are not described in the literature is estimated by using the correlation obtained above.

An anion constituting a transition metal salt of the facilitated transport membrane according to the present invention is preferably selected from anions having a lattice energy of 2500 kJ/mol or less in order to improve solvation stability and suppress the tendency to form a strong ion pair with a cation. Among the metal salts listed in Table 2, anions may include $F^-$, $Cl^-$, $Br^-$, $I^-$, $CN^-$, $NO_3^-$ and $BF_4^-$, which constitute salts with $Ag^+$ or $Cu^+$. Anions applicable to the present invention, however, are not limited only to those listed in Table 2.

The solution stability of anions is generally exhibited in the order of $F^- << Cl^- < Br^- < I^- \sim SCN^- < ClO_4^- \sim CF_3SO_3^- < BF_4^- \sim AsF_6^-$, in which lattice energy decreases, i.e., the tendency of the anions to form strong ion pairs with cations of metal salts is reduced as it progresses toward the right. These various anions, which are desirable for use in the facilitated transport membrane according to the present invention due to low lattice energy, have been widely utilized in electrochemical devices such as batteries or electrochemical capacitors, etc. Such anions may include $SCN^-$, $ClO_4^-$, $CF_3SO_3^-$, $BF_4^-$, $AsF_6^-$, $PF_6^-$, $SbF_6^-$, $AlCl_4^-$, $N(SO_2CF_3)_2^-$, $C(SO_3)_3^-$, etc., but various anions in addition to those illustrated herein can be used in the present invention. Anions coinciding with the object of the present invention are not limited to those described herein.

Further, monosalts as well as complex salts of transition metals, such as $(M_1)_x(M_2)_xX_y$, $(M_1)_x(X_1)_y(M_2)_{x'}(X_2)_{y'}$ (wherein, $M_1$ and $M_2$ represent a cation; X, $X_1$ and $X_2$ represent an anion; and x, x', y and y' represent an atomic value) or organic salt-transition metal salts, or physical mixtures of at least one salt may be used in the facilitated transport separation of the present invention.

Examples of the complex salts of transition metals may include $RbAg_4I_5$, $Ag_2HgI_4$, $RbAg_4I_4CN$, $AgHgSI$, $AgHgTeI$, $Ag_3SI$, $Ag_6I_4WO_4$, $Ag_7I_4AsO_4$, $Ag_7I_4PO_4$, $Ag_{19}I_{15}P_2O_7$, $Rb_4Cu_{16}I_7Cl_{13}$, $Rb_3Cu_7Cl_{10}$, AgI-(tetraalkyl ammonium iodide), AgI—$(CH_3)_3SI$, $C_6H_{12}N_4.CH_3I$—CuI, $C_6H_{12}N_4.4CH_3Br$—CuBr, $C_6H_{12}N_4.4C_2H_5Br$—CuBr, $C_6H_{12}N_4.4HCl$—CuCl, $C_6H_{12}N_2.2CH_3I$—CuI, $C_6H_{12}N_2.2CH_3Br$—CuBr, $C_6H_{12}N_2.2CH_3Cl$—CuCl, $C_5H_{11}NCH_3I$—CuI, $C_5H_{11}NCH_3Br$—CuBr, $C_4H_8ON.CH_3I$—CuI, etc. However, numerous combinations similar to these complex salts or mixtures of salts can be made within the spirit of the present invention. As such, the present invention is not limited to those illustrated above.

The polymer used in the present invention must have phthalic structure, as described above, so that it can form a complex with transition metal salts and be coordinated to a transition metal ion. That is, the polymer used in the solid electrolyte of the facilitated transport membrane according to the present invention must have phthalic structure to interact with a transition metal salt. The representative examples of the polymer may include poly(ethylene phthalate) (—$COC_6H_4CO_2(CH_2)_2O$—), polyol (—$CRCOH_2CH_2CH_2CCO_2RCO_2C_6H_4CO_2$—, wherein R=$C_3H_6OC_3H_6$ or $CH_3CH_2C(CH_2)_3OH$), poly(diallyl phthalate) (—$CH_2CHCH_2COCOC_6H_4CO_2CH_2CHCH_2$—), poly(ethylene phthalate-co-1,4-phenylene phthalate) (—$COC_6H_4CO_2(CH_2)_2O$-co-$COC_6H_4CO_2C_6H_4O$—), and the like.

Any polymer that does not depart from the object of the present invention and is selected from these polymers, homopolymers or copolymers thereof, derivatives having the polymers as a backbone or a branch, or physical mixtures of the polymers, etc., may be used in the facilitated transport membrane of the present invention. Further, various polymers in addition to the polymers illustrated above may be used in the membrane. Thus, polymers coinciding with the object of the present invention are not limited to those described herein.

The facilitated transport membrane according to the present invention is prepared by applying a polymer electrolyte solution on a porous support and then drying it. The polymer electrolyte solution that is used in preparing the facilitated transport membrane is prepared by dissolving a transition metal salt and a polymer having phthalic structure in a liquid solvent to prepare a coating solution. Any liquid solvent that does not impair the support and can dissolve the transition metal and polymer can be used as a liquid solvent in the process.

Various methods that are well known in the art can be used in applying the electrolyte coating solution on the support. For example, blade/knife coating, Mayer bar coating, dip coating, air knife coating, etc., may be conveniently used in this regard.

The thickness of the solid electrolyte formed on the support after drying is preferably as thin as possible in order to enhance permeance. If the dry thickness of the solid electrolyte layer is too thin, however, all pores of a porous support membrane are not blocked, or punctures occur in the membrane due to a pressure difference in operation, resulting in selectivity deterioration. Therefore, the dry thickness of said layer is preferably in the range of from 0.05 μm to 10 μm, more preferably in the range of from 0.1 μm to 3 μm.

Another feature of the facilitated transport membrane is high selective permeance to alkenes. The facilitated transport membrane prepared according to the present invention exhibits very high selectivity to alkene hydrocarbons, which is superior to prior selectivity to alkene hydrocarbons. It also sustains its activity even in a completely dry state because the solid electrolyte consists of a metal salt and a non-volatile polymer. Further, the facilitated transport membrane is suitable for the practical separation process of alkane/alkene since its long-term operation stability is high due to the absence of components that can be volatilized during operation.

The present invention is illustrated in detail by, but is not limited to, the examples below.

EXAMPLE 1

0.1 g of poly(ethylene phthalate) (PEP, $M_w$=19,800) prepared by condensation polymerization of ethylene glycol and phthalic anhydride was dissolved in 0.9 g of tetrahydrofuran (THF) to obtain a uniform and clear polymer solution (polymer concentration=10 wt %).

0.1 g of silver tetrafluoroborate ($AgBF_4$, 98%, Aldrich Co.) was added then to obtain a solution having a [C=O]:[Ag] mole ratio of 1:1. The resulting solution was coated on a polyester porous membrane (track etched membrane, 0.1 μm polyester, Whatman) using a Mayer bar. The thickness of the substantial separation layer determined by a high resolution electron microscope (SEM) was about 1.5 μm. The separation membrane thus prepared was completely dried in a dry oven for 2 hrs and a vacuum oven for 48 hrs at room temperature.

The separation performance evaluation of the membrane was then carried out by using a propylene/propane mixture (50:50 vol %) at room temperature. The permeance of a permeated gas was determined with a soap-bubble flow meter, and the composition ratio was determined with gas chromatography. The measured results expressed in GPU [$10^{-6}$ $cm^3$(STP)/$cm^2$.cmHg.sec] are shown in Table 3 below. As shown in Table 3, the permeance and selectivity to gas mixture was somewhat decreased with an increase of pressure.

TABLE 3

| Pressure (psig) | Permeance to a gas mixture[a] (GPU) | Selectivity to a gas mixture[a] (GPU) |
|---|---|---|
| 10 | 6.3 | 54.4 |
| 20 | 5.2 | 53.8 |
| 30 | 4.8 | 52.7 |
| 40 | 4.5 | 52.3 |

[a]50:50 vol % propylene and propane mixture

EXAMPLE 2

The separation membrane prepared in Example 1 was evaluated for long-term operation performance at room temperature. The separation performance was tested using a propylene/propane mixture (50:50 vol %) under conditions wherein the pressure of the top portion was 40 psig and the pressure of permeation the portion was 0 psig.

The permeance of a permeated gas was determined with a soap-bubble flow meter, and the composition ratio was determined with gas chromatography to evaluate the long-term operation performance. A poly(2-ethyl-2-oxazoline) (POZ)/AgBF$_4$ separation membrane having a functional group including oxygen, which is not according to the present invention, was also evaluated for long-term operation performance as described above. The results are presented in Table 4 below.

TABLE 4

|  | PEP/AgBF$_4$ | | POZ/AgBF$_4$ | |
| --- | --- | --- | --- | --- |
| Time (hr) | Permeance to a gas mixture[a] (GPU) | Selectivity to a gas mixture[a] (GPU) | Permeance to a gas mixture[a] (GPU) | Selectivity to gas mixture[a] (GPU) |
| 2 | 6.1 | 52.3 | 16 | 52 |
| 6 | 5.8 | 50.8 | 15 | 52 |
| 12 | 5.9 | 52.9 | 12 | 51 |
| 24 | 5.4 | 53.2 | 13 | 48 |
| 48 | 5.5 | 54.7 | 12 | 42 |
| 72 | 5.8 | 53.6 | 7 | 37 |
| 96 | 5.9 | 51.1 | 5 | 34 |
| 120 | 6.3 | 53.5 | 4 | 31 |
| 144 | 6.2 | 53.6 | 3 | 29 |

[a] 50:50 vol % propylene and propane mixture

As shown in Table 4, the permeance and selectivity of the POZ/AgBF$_4$ separation membrane not according to the present invention continuously decreased, while the performance of the PEP/AgBF$_4$ separation membrane according to the present invention barely decreased and was maintained during a long-term operation of about 150 hrs.

EXAMPLE 3

The membranes having various mole ratios of PEP to AgBF$_4$ prepared by using the same method described in Example 1 were evaluated for permeance and selectivity as described in Example 2. The results are given in Table 5 below.

TABLE 5

| Mole ratio of PEP:AgBF$_4$ | Permeance to a gas mixture[a] (GPU) | Selectivity to a gas mixture[a] (GPU) |
| --- | --- | --- |
| No AgBF$_4$ | 1.09 | 0.98 |
| 10:1 | 3.2 | 1.5 |
| 7:1 | 3.8 | 1.2 |
| 5:1 | 4.1 | 1.4 |
| 3:1 | 4.5 | 1.3 |
| 2:1 | 4.9 | 1.6 |
| 1:1 | 5.8 | 53.5 |
| 1:2 | 5.6 | 54.2 |
| 1:3 | 5.8 | 53.9 |

[a] 50:50 vol % propylene and propane mixture

As shown in Table 5, a polymer separation membrane containing no AgBF$_4$ did not exhibit a facilitated transport phenomenon. However, the membranes containing AgBF$_4$ exhibited permeance that slowly increased with the increase of the mole ratio of AgBF$_4$, and exhibited prominent selectivity when the PEP to AgBF$_4$ mole ratio was 1:1 or more. The permeance and selectivity of the membranes having a higher mole ratio of AgBF$_4$ than 1:1 shown no further increase.

EXAMPLE 4

The membrane was prepared in the same manner as described in Example 1, except that AgCF$_3$SO$_3$ was used in place of AgBF$_4$. The membrane was evaluated for a long-term operation performance as described in Example 2. The results are given in Table 6 below. As shown in Table 6, the performance of the membrane barely decreased and was maintained during a long-term operation of about 150 hrs.

TABLE 6

| Time (hour) | Permeance to a gas mixture[a] (GPU) | Selectivity to a gas mixture[a] ((propylene/propane)) |
| --- | --- | --- |
| 2 | 12.4 | 14.5 |
| 6 | 12.4 | 15.7 |
| 12 | 12.7 | 15.4 |
| 24 | 12.8 | 15.8 |
| 48 | 12.2 | 15.2 |
| 72 | 12.3 | 15.5 |
| 96 | 12.6 | 16.0 |
| 120 | 12.5 | 15.8 |
| 150 | 12.4 | 15.7 |

[a] 50:50 vol % propylene and propane mixture

The facilitated transport membrane prepared according to the present invention exhibits very high selectivity to alkene hydrocarbons, which is superior to the prior selectivity to alkene hydrocarbons. Furthermore, no problems, e.g., reduction of a transition metal ion to a transition metal, arose in using a polymer matrix having a functional group containing oxygen and/or nitrogen since a polymer matrix of the facilitated transport membrane according to the present invention has phthalic structure capable of strongly interacting with a transition metal salt.

While the present invention has been shown and described with respect to particular examples, it will be apparent to those skilled in the art that many changes and modifications can be made without departing from the spirit and scope of the invention as defined in the appended claims.

What is claimed is:

1. A facilitated transport membrane for separation of alkene hydrocarbons from hydrocarbon mixtures, comprising a porous support and a solid polymer electrolyte consisting of a transition metal salt and a polymer having phthalic structure.

2. The facilitated transport membrane according to claim 1, wherein a cation of the transition metal salt has the electronegativity of 1.6~2.3.

3. The facilitated transport membrane according to claim 2, wherein the transition metal is one selected from the group consisting of Mn, Fe, Co, Ni, Cu, Mo, Tc, Ru, Rh, Pd, Ag, Re, Os, Ir, Pt and complexes thereof.

4. The facilitated transport membrane according to claim 1, wherein the transition metal salt has a lattice energy of 2500 kJ/mol or less.

5. The facilitated transport membrane according to claim 4, wherein an anion of the transition metal salt is one selected from the group consisting of F$^-$, Cl$^-$, Br$^-$, I$^-$, CN$^-$, NO$_3^-$, SCN$^-$, ClO$_4^-$, CF$_3$SO$_3^-$, BF$_4^-$, AsF$_6^-$, PF$_6^-$, SbF$_6^-$, AlCl$_4^-$, N(SO$_2$CF$_3$)$_2^-$ and C(SO$_2$CF$_3$)$_3^-$.

6. The facilitated transport membrane according to claim 1, wherein the transition metal salt includes a complex salt of transition metal or a mixture of transition metal salts.

7. The facilitated transport membrane according to claim 1, wherein the polymer is one selected from the group consisting of poly(ethylene phthalate), poly(diallyl phthalate), poly(ethylene phthalate-co-1,4-phenylene phthalate) and physical mixtures thereof.

8. The facilitated transport membrane according to claim 1, wherein the porous support is a porous polymer membrane or ceramic membrane used in the preparation of a conventional composite membrane.

9. The facilitated transport membrane according to claim 1, wherein the hydrocarbon mixtures to be separated contain at least one alkene hydrocarbon and at least one alkane hydrocarbon and/or other gas.

10. The facilitated transport membrane according to claim 9, wherein the alkene hydrocarbon is one selected from the group consisting of ethylene, propylene, butylene, 1,3-butadiene, isobutylene and mixtures thereof; the alkane hydrocarbon is one selected from the group consisting of methane, ethane, propane, butane, isobutane and mixtures thereof, and the other gas is one selected from the group consisting of oxygen, nitrogen, carbon dioxide, carbon monoxide, water and mixtures thereof.

* * * * *